(12) United States Patent
Loeben et al.

(10) Patent No.: US 10,679,073 B2
(45) Date of Patent: Jun. 9, 2020

(54) METHOD FOR SHAPE RECOGNITION OF AN OBJECT OUTSIDE OF A TRANSPORTATION VEHICLE AND TRANSPORTATION VEHICLE

(71) Applicant: VOLKSWAGEN AKTIENGESELLSCHAFT, Wolfsburg (DE)

(72) Inventors: Dennis Loeben, Berlin (DE); Christoph Erfurth, Berlin (DE); Marek Musial, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 16/164,954

(22) Filed: Oct. 19, 2018

(65) Prior Publication Data
US 2019/0122053 A1 Apr. 25, 2019

(30) Foreign Application Priority Data
Oct. 25, 2017 (DE) .......................... 10 2017 219 119

(51) Int. Cl.
*H04N 7/18* (2006.01)
*H04N 5/225* (2006.01)
(Continued)

(52) U.S. Cl.
CPC .......... *G06K 9/00791* (2013.01); *B60D 1/36* (2013.01); *B60D 1/62* (2013.01); *B60R 1/003* (2013.01);
(Continued)

(58) Field of Classification Search
CPC .......... H04N 7/186; H04N 7/183; H04N 7/18; H04N 5/225; H04N 7/181; G06K 9/00791;
(Continued)

(56) References Cited

U.S. PATENT DOCUMENTS

| 2009/0236825 A1 | 9/2009 | Okuda et al. |
| 2017/0314930 A1* | 11/2017 | Monterroza ............... G06T 7/73 |
| 2019/0118594 A1* | 4/2019 | Loeben ............... G06K 9/00791 |

FOREIGN PATENT DOCUMENTS

| DE | 102008046215 A1 | 9/2009 |
| DE | 102009053807 A1 | 5/2011 |

(Continued)

OTHER PUBLICATIONS

Search Report for German Patent Application No. 10 2017 219 119.8; dated Mar. 9, 2018.

*Primary Examiner* — Sherrie Hsia
(74) *Attorney, Agent, or Firm* — Barnes & Thornburg LLP

(57) ABSTRACT

A method for recognizing the shape of an object outside of a transportation vehicle, wherein a respective image is generated at at least two different measurement time points and at least one scanline is specified in a first one of the images and a corresponding scanline is specified in each other of the images, and for each scanline of the first image, a profile resulting along the scanline is determined and a corresponding profile is determined along the respective corresponding scanline of each other image, and by comparing the profile of each scanline of the first image to the respective corresponding profile of each other image a respective displacement distance resulting between the measurement time points of characteristic regions is determined, and a distinction is made of each characteristic region between object and background based on the determined displacement distance.

39 Claims, 4 Drawing Sheets

(51) Int. Cl.

| | | |
|---|---|---|
| *G06K 9/00* | (2006.01) | |
| *G01B 11/14* | (2006.01) | |
| *B60D 1/62* | (2006.01) | |
| *G01B 11/25* | (2006.01) | |
| *B60D 1/36* | (2006.01) | |
| *G06T 7/73* | (2017.01) | |
| *G06T 7/55* | (2017.01) | |
| *G06T 7/246* | (2017.01) | |
| *B60R 1/00* | (2006.01) | |
| *G06K 9/46* | (2006.01) | |
| *G06K 9/62* | (2006.01) | |
| *G06T 7/60* | (2017.01) | |
| *G06T 7/194* | (2017.01) | |
| *G06T 7/13* | (2017.01) | |
| *G06T 7/90* | (2017.01) | |

(52) U.S. Cl.
CPC .............. *G01B 11/14* (2013.01); *G01B 11/25* (2013.01); *G06K 9/46* (2013.01); *G06K 9/6201* (2013.01); *G06T 7/248* (2017.01); *G06T 7/55* (2017.01); *G06T 7/60* (2013.01); *G06T 7/73* (2017.01); *H04N 5/225* (2013.01); *B60R 2300/808* (2013.01); *G06K 2009/6213* (2013.01); *G06T 7/13* (2017.01); *G06T 7/194* (2017.01); *G06T 7/90* (2017.01); *G06T 2207/10016* (2013.01); *G06T 2207/30252* (2013.01); *G06T 2207/30261* (2013.01)

(58) Field of Classification Search
CPC ............. G06K 2009/6213; G06K 9/46; G06K 9/6201; G06T 7/55; G06T 2207/10016; G06T 2207/30261; G06T 7/73; G06T 2207/30252; G06T 7/13; G06T 7/194; G06T 7/248; G06T 7/60; G06T 7/90; B60D 1/62; B60D 1/36; B60R 1/003; B60R 2300/808; G01B 11/14; G01B 11/25
USPC ........ 348/135, 143, 148, 156; 702/127, 150; 382/104

See application file for complete search history.

(56) References Cited

FOREIGN PATENT DOCUMENTS

| | | |
|---|---|---|
| DE | 102012011121 A1 | 12/2013 |
| DE | 102014114078 A1 | 4/2015 |
| DE | 102015201586 A1 | 8/2016 |
| DE | 102015211754 A1 | 12/2016 |
| EP | 2634070 A1 | 9/2013 |
| EP | 3081405 A2 | 10/2016 |
| GB | 2513393 A | 10/2014 |
| WO | 2012080044 A1 | 6/2012 |
| WO | 2016155919 A1 | 10/2016 |
| WO | 2017009330 A1 | 1/2017 |

* cited by examiner

METHOD FOR SHAPE RECOGNITION OF AN OBJECT OUTSIDE OF A TRANSPORTATION VEHICLE AND TRANSPORTATION VEHICLE

PRIORITY CLAIM

This patent application claims priority to German Patent Application No. 10 2017 219 119.8, filed 25 Oct. 2017, the disclosure of which is incorporated herein by reference in its entirety.

SUMMARY

Illustrative embodiments relate to a method for surveying an object in an external region of a transportation vehicle. The survey is performed optically by a camera while the transportation vehicle is moved relative to the object. A control apparatus for carrying out the method and a transportation vehicle with the disclosed control apparatus are also disclosed.

BRIEF DESCRIPTION OF THE DRAWINGS

An exemplary embodiment is described below. In the drawings.

DETAILED DESCRIPTION

Figure 1:
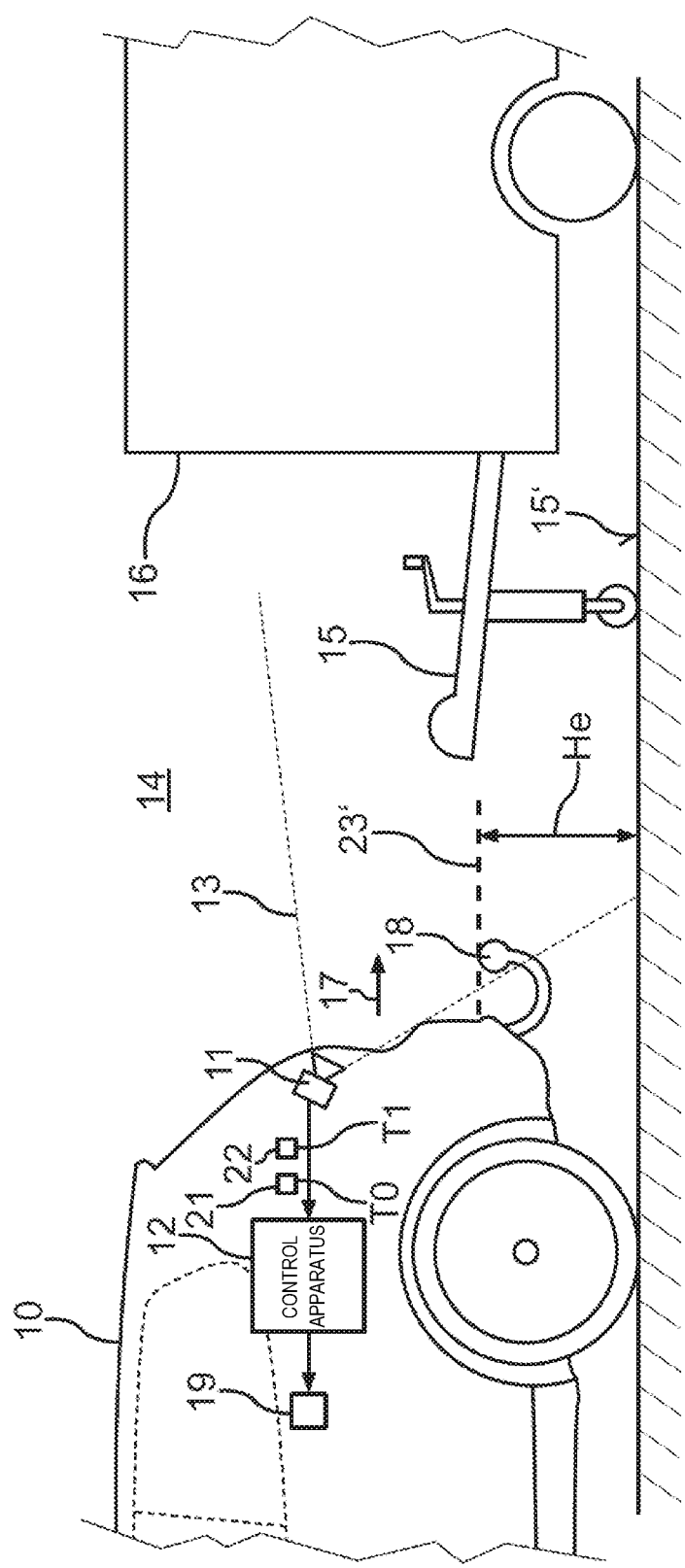
FIG. 1 shows a schematic illustration of an exemplary embodiment of the disclosed transportation vehicle.

If one wants to maneuver a transportation vehicle relative to an object, and/or to connect the object to the transportation vehicle or couple it to the transportation vehicle, it is beneficial to know the dimensions or the geometry of the object. This is true if the maneuvering of the transportation vehicle is to be performed automatically, i.e., performed without an intervention of a driver by a control apparatus.

Coupling a trailer to a transportation vehicle is an example for such maneuvering. To bring the trailer coupling of the transportation vehicle up to the towbar of the trailer and to position it in a predetermined target position or coupling position, the spatial position of the trailer coupling must be known.

Determining the relative position by a marker that makes the position of the trailer towbar recognizable while the transportation vehicle approaches the trailer towbar is known from EP 3 081 405 A2. This marker can, for example, indicate the GPS coordinates of the trailer towbar. Locating the trailer towbar by a camera or another sensor, a radar, for example, is also considered. A more accurate algorithm for the optical location is not described. The use of a marker has the drawback that such a marker must be made available for a trailer, which makes this solution expensive.

Using a camera to localize a trailer towbar is known from WO 2016/155919 A1. The shape of the trailer towbar is recognized here in camera images from the camera. It is necessary in this case for the geometry of the trailer towbar to be stored in a data library in the transportation vehicle, so that it can then be recognized in camera images. This, however, makes it necessary to provide the appropriate geometric data in the data library for every trailer to which it is possible that the transportation vehicle should be coupled.

Determining a relative position of a trailer with respect to a transportation vehicle on the basis of camera images by an image processing system is known from GB 2513393 A. Here again the geometry of the trailer must first be made known to the transportation vehicle by a file with geometric data.

A method for determining a relative movement between a transportation vehicle and an object in an external region of the transportation vehicle on the basis of an optical flow that is formed from an image sequence of a camera is known from WO 2012/080044 A1. A recognition of the shape of the object is not provided here.

Disclosed embodiments recognize, from out of a transportation vehicle, a shape of an object that is located in an external region of a transportation vehicle.

A method for recognizing the shape of an object in an external region of a transportation vehicle is provided. The method is carried out while the transportation vehicle moves relative to the object. A respective image is generated here by a control apparatus of the transportation vehicle at at least two different measurement time points by a camera. The image shows the object in front of a background of the external region. At least one sampling line or scanline is specified in a first one of the images. A scanline is a conceptual line in the image, along which the pixel values of individual pixels of the image are considered or analyzed. For each scanline, a corresponding scanline is specified in each other of the images. Each corresponding scanline has the same progression in the respective image as the associated scanline of the first image with which it corresponds. A corresponding scanline thus has the same shape as the associated scanline.

For each scanline of the first image, a profile resulting along the scanline is determined for a predetermined image property, for example, the pixel brightness or the color values of the pixels. A resulting corresponding profile is accordingly determined along the respective corresponding scanline of each other image. Each profile thus describes the respective progression of the image property, which is to say, for example, the pixel brightness or the color values of the pixels, along the respective scanline. At least one characteristic region of the scanline is determined for each scanline of the first image on the basis of the profile of the scanline. Such a characteristic region is a profile segment with a predetermined characteristic shape. An example of such a characteristic region can be a maximum or a double-peak in the progression of the profile. Such a characteristic region can be recognized in a corresponding scanline. By comparing the profile of each scanline of the first image to the respective corresponding profile of each other image, the at least one characteristic region is accordingly recognized in the respective corresponding profile. Thus, in other words, for each scanline of the first image, at least one characteristic region of the profile of this scanline is determined, and, by comparing the profile to the respective corresponding profile of each other image, the at least one characteristic region is recognized in the respective corresponding profile. It is now possible to recognize where the characteristic region is located in the profile and in the corresponding profile in each case. It is possible to recognize the distance that they have been displaced with respect to one another. A displacement distance resulting between the measurement time points of the characteristic region along the respective scanline is then determined or each characteristic region of the profile of each scanline. One thus checks or recognizes the distance that the characteristic region has been displaced along the respective scanline as a result of the relative movement of the transportation vehicle to the object in the image. This displacement depends on the distance of the respective image content (object or background) from the camera. This effect is referred to as parallax. A distinction is accordingly made along each scanline, depending on the determined displacement distance of each characteristic region of the profile of the scanline, between object and background. Such a distinction is also referred to as segmentation. The segmentation is carried out here purely optically on the basis of at least two camera images.

Disclosed embodiments provide for an object to be recognized on the basis of camera images from a camera without prior knowledge of the object. The disclosed method can thus be realized in a transportation vehicle with little extra expense for components or circuitry.

At least one disclosed embodiment provides that to distinguish between object and background, a height value is assigned to each characteristic region of the profile of each scanline depending on its displacement distance, and a height profile is hereby generated along each scanline. A distinction is then made between object and background along each scanline on the basis of the respective height profile. This yields the benefit that a surface profile of the object is also determined (height profile in the region of the object).

At least one disclosed embodiment provides that the predetermined image property on the basis of which the respective profile is formed along each scanline comprises a color value and/or a contrast value and/or an edge detection value of an image content of the image. An edge detection value can, for example, be formed on the basis of a local derivative, as it can, for example, be formed as a difference in the brightness values of neighboring pixels of the image. Those pixels that are arranged along the scanline are naturally used here for the determination of the profile. The image properties have the benefit that with them a distinction can be made optically between object and background.

At least one disclosed embodiment provides that the characteristic regions are specified by a predetermined feature detection which identifies at least one predetermined characteristic pattern in the respective profile as a characteristic region. Such a characteristic pattern can, for example, be a local maximum or a local minimum. It can also be provided that a predetermined minimum conspicuousness, i.e., for example, a predetermined minimum height or minimum depth, is required of such a local maximum or local minimum for a characteristic region to be identified. The disclosed embodiment has at least one characteristic region that can be identified in a profile automatically.

At least one disclosed embodiment provides that the scanlines and the corresponding scanlines have a progression that corresponds to an image of a beam that extends virtually in a straight line three-dimensionally in the external region away from the transportation vehicle at a predetermined height. The benefit arises from this that a component of the object that lies in the first image on a first specific scanline comes to lie on a corresponding scanline of another image when there is a movement of the transportation vehicle. The predetermined height here may be an expected or known height of the object. The probability that the components come to lie on different scanlines between two images is hereby reduced.

At least one disclosed embodiment provides that a movement of the transportation vehicle directly forwards is recognized, and the images are generated during the direct forwards movement. The capture of the images is hereby triggered at a time point that is favorable for ensuring that characteristic regions are found in the profile that are also contained in each corresponding profile.

If the transportation vehicle does not perform a direct forwards movement, at least one disclosed embodiment provides that the shape of the scanlines is adjusted depending on a steering angle of the transportation vehicle. Even when the transportation vehicle is moving on a curve it can hereby be made possible that a component of the object comes to lie on a specific scanline of the first object, moves along the scanline as the transportation vehicle moves on, and thus also comes to lie on a corresponding scanline of another image. Accordingly, a characteristic region is then found also in the profile of the scanline, which is contained in the corresponding profile of the corresponding scanline and can thus be recognized.

At least on disclosed embodiment provides that the height values of the characteristic regions are rastered to a predetermined number of possible height values. Noise can hereby be reduced. It can be provided that two possible height values are provided, of which one represents an expected height of the object and a second represents an expected height of the background, and the closer height profiles (two-value height profiles) are thus generated. By rastering to expected height values of the object and of the background, an ambiguity resulting from irregularities or from intermediate values that result, for example, from further objects that have a lower height than the object, is removed. If, for example, a trailer coupling that is standing on grassy ground is captured as an object, all the blades of grass are assigned to the ground and a flat ground is represented in the height profile.

At least one disclosed embodiment provides that a driving surface of the transportation vehicle is captured as the background. In other words, the camera is aligned in such a way that its capture region is aimed onto the object from above. The driving surface of the transportation vehicle then results as the background. This has the benefit that the described parallax effect permits an effective distinction between object and background.

At least one disclosed embodiment provides that all those segments in the height profiles whose height value lies in a predetermined value interval are assigned to the object. A segmentation results from this which additionally yields a surface description or description of the shape of the object.

As a result of the segmentation, the object can be surveyed, or at least a shape or a width of the object can be captured or described.

At least one disclosed embodiment provides that the height profiles of the scanlines are combined to form a two-dimensional height map. In other words, the line structure is eliminated in that height values are interpolated between the scanlines. A two-dimensional height map results from this. This disclosed embodiment provides that a height value is defined for each point of the two-dimensional surface.

At least one disclosed embodiment provides that the images are determined during an approach of the transportation vehicle to a trailer towbar of a trailer. The object is thus the trailer towbar. A dimension and/or shape of the trailer towbar is determined on the basis of the described distinction between object and background. The approach of the transportation vehicle means that the object, that is to say the trailer towbar, is not yet coupled to the transportation vehicle. The transportation vehicle drives toward the object, i.e., in particular, to the trailer towbar. When the trailer towbar is then reached, its dimension and/or shape is determined. A coupling procedure, or the positioning of a trailer coupling relative to the trailer towbar, can thus be carried out on the basis of the determined dimension and/or shape. It is thus not necessary to previously make the shape and/or dimension of the trailer towbar known on the basis, for example, of a data file with geometric data. It is determined automatically as the transportation vehicle approaches the trailer towbar.

To carry out the disclosed method in a transportation vehicle, a control apparatus for a transportation vehicle is also provided. The control apparatus can be a control device of the transportation vehicle. The control apparatus comprises a computing device that is configured to carry out at least one exemplary embodiment of the disclosed method. The computing device can comprise program code for this purpose that carries out the disclosed embodiment of the method when executed by the computing device. The program code can be stored in a data memory of the computing device.

Disclosed embodiments also provide a transportation vehicle with at least one camera for an external region of the transportation vehicle and with a disclosed embodiment of the disclosed control apparatus. The control apparatus is coupled to the at least one camera. The control apparatus can thus carry out the disclosed method on the basis of images from the at least one camera. The disclosed transportation vehicle may be designed as an automobile, in particular, a passenger car or truck.

The combinations of the embodiment described also belong to the disclosure.

In the exemplary embodiment, the described components of the disclosed embodiment each represent single features of the disclosure that are to be considered independently of one another, each of which also develops the disclosure independently of one another, and are thus also to be considered individually, or in a combination other than that illustrated, as elements of the disclosure. The embodiment described can, moreover, also be extended through more of the features of the disclosure already described.

Elements with the same function are each given the same reference signs in the figures.

FIG. 1 shows a transportation vehicle 10 which can be an automobile, in particular, a passenger car or truck. The transportation vehicle 10 can comprise a camera 11 which can, for example, be a video camera or a still image camera. The camera 11 can be a rear camera of the transportation vehicle 10. A control apparatus 12 of the transportation vehicle 10 is furthermore illustrated. The control apparatus 12 can, for example, be formed by a control device of the transportation vehicle 10. A capture region 13 of the camera 11 can be aimed at an external region 14 of the transportation vehicle 10, for example, in a backward region behind the transportation vehicle 10, which means at the rear of the transportation vehicle 10. An object 15 can thus be captured in the external region 14 by the camera 11. In the illustrated example, the object 15 can be a trailer towbar of a trailer 16. For the further explanation of the exemplary embodiment, it is assumed that the trailer 16 is to be transported with the transportation vehicle 10. The transportation vehicle 10 is moved relatively toward the object 15 for this purpose, which means that an approach 17 of the transportation vehicle 10 to the object 15 takes place. The transportation vehicle 10 is, for example, to be brought into such a position relative to the object 15 that the object 15 can be connected to a trailer coupling 18 of the transportation vehicle 10, without the object 15 having to be displaced or rolled for this.

A shape or dimension 19 of the object 15 can be determined and signaled by the control apparatus 12 for this purpose.

Figure 2:
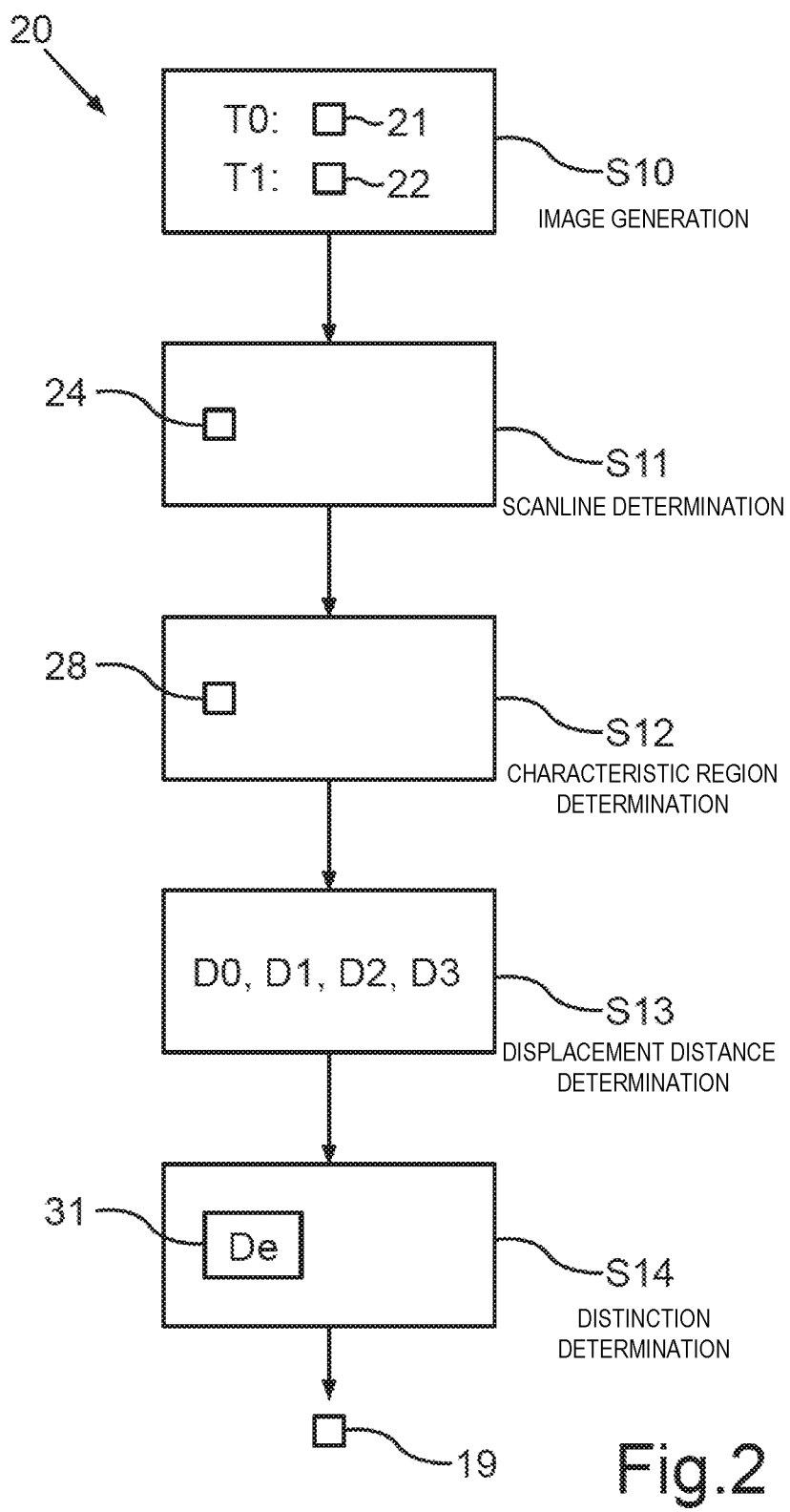
FIG. 2 shows a flow diagram of an exemplary embodiment of the disclosed method.

FIG. 2 illustrates a method 20 for this which can be carried out by the control apparatus 12 to determine the shape and/or dimension 19 of the object 15.

During the approach 17 a camera image, more concisely image 21, 22 of the object 15 against a background 15' can be generated or recorded in an operation at S10 at two different measurement time points T0, T1 by the control apparatus 12 using the camera 11. With the alignment of the capture region 13 of the camera 11 illustrated, the background 15' can be a driving surface.

Figure 3:
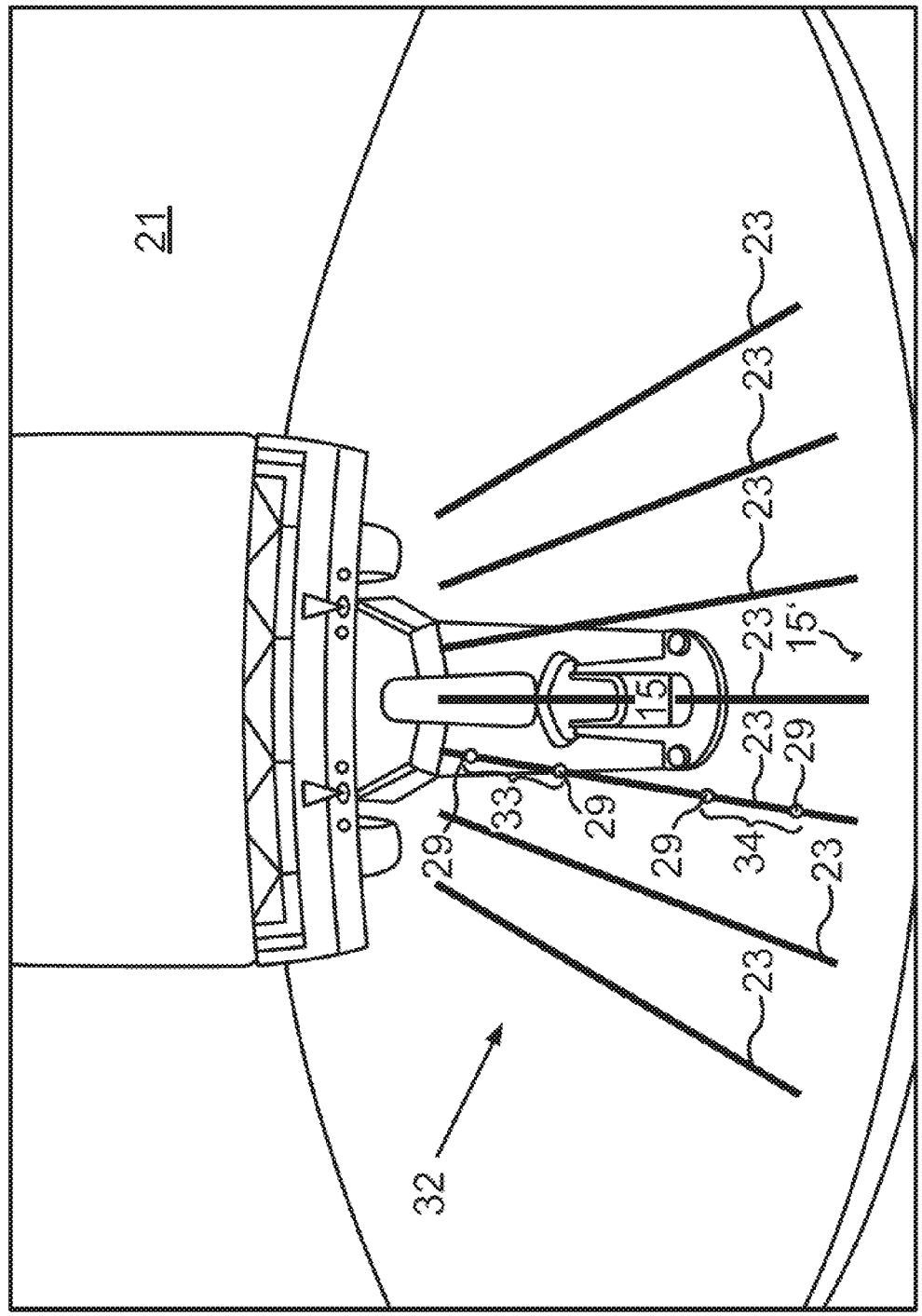
FIG. 3 shows a schematic illustration of an image from a camera with an object represented therein.
Figure 4:
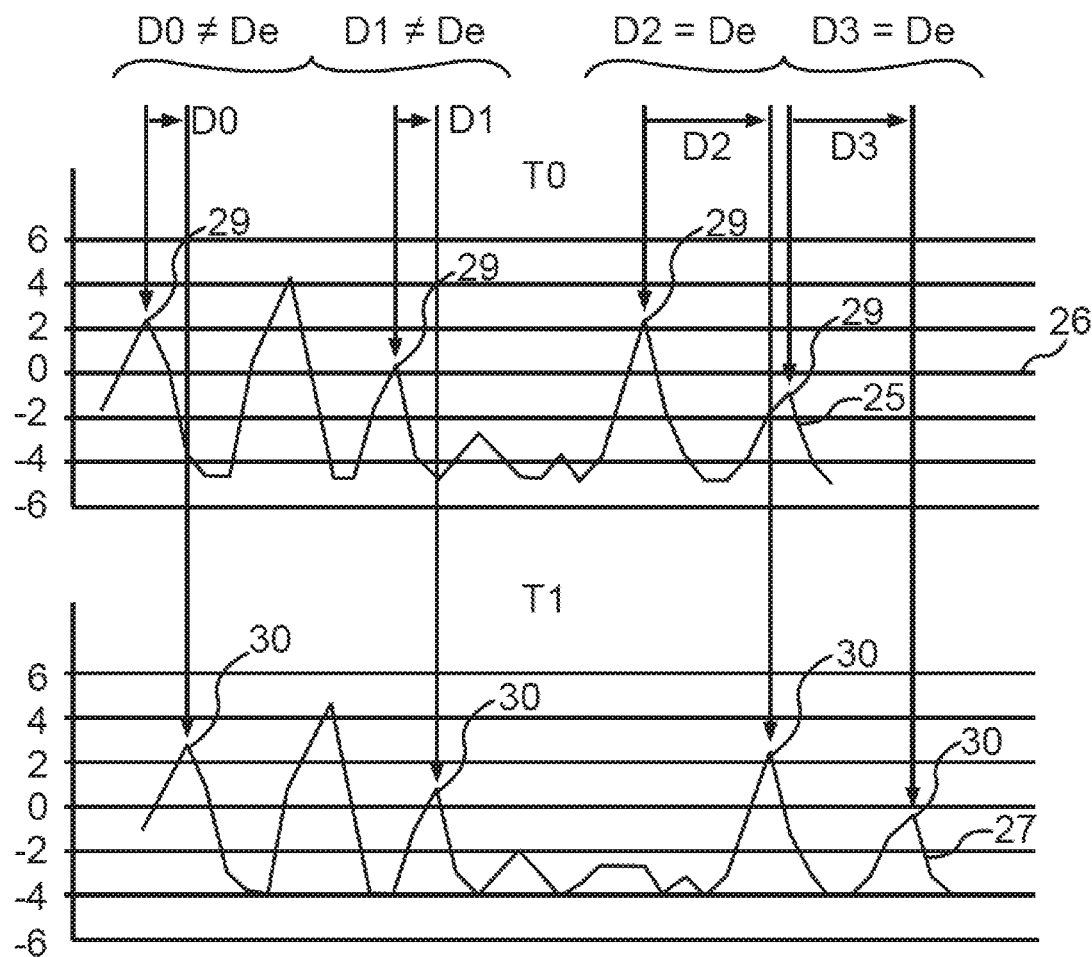
FIG. 4 shows a diagram with a profile and a corresponding profile that were captured at different measurement time points.

Reference is made to FIG. 3 and FIG. 4 for the further explanation of the method 20.

FIG. 3 shows an exemplary image 21 such as can be generated with the camera 11.

At least one scanline 23 can be defined or specified in an operation at S11 by the control apparatus 12 in a first one of the images, here, by way of example, the image 21. Each scanline 23 can correspond to the image of a beam 23' (see FIG. 1) that extends in a straight line away from the transportation vehicle at a height He. The height He can be a known height of the object 15. The same scanlines 23 can be defined in the image 22 and in each other image. They thus represent scanlines that correspond to the scanlines 23 of the image 21.

For each scanline 23 of the image 21, a profile 25 resulting along the scanline is formed for a predetermined image property 24, as is illustrated, by way of example, in FIG. 4.

FIG. 4 illustrates the resulting profile 25 along an axis 26 that corresponds to the progression of the scanline 23 of the image 21 for an image property 24 that represents the value of an edge detection. For each point of the profile 25, the difference of the brightness values of neighboring pixels along the scanline 23 can, for example, be calculated for this purpose. FIG. 4 furthermore illustrates how, for the corresponding scanline in image 22, a corresponding profile 27 can be determined on the basis of the image property 24 for the image 22, i.e., for the measurement time point T1.

At least one characteristic region 29 can now be determined in an operation at S12 for the profile 25 on the basis of a feature detection 28. The feature detection 28 can, for example, identify local maxima as a respective characteristic region. Each characteristic region 29 of the profile 25 can now be recognized again in the profile 27 as a recognized characteristic region 30. This can, for example, be done on the basis of a correlation.

A displacement distance D0, D1, D2, D3 resulting between the measurement time points T0 and T1 of the respective characteristic region 29 along the respective scanline 23 can now be determined in an operation at S13 for each characteristic region 29. The displacement distance D0, D1, D2, D3 depends on the one hand on the distance through which the transportation vehicle 10 has moved during the approach 17 between the two measurement time points T0, T1, and on the other hand on the distance of the image content illustrated respectively in the characteristic region 29 from the camera 11. As a result of the different distances of the image contents, the parallax effect results, which means that a different displacement distance D0, D1, D2, D3 results depending on the distance of the respective image content from the camera 11.

In an operation at S14 a distinction can now be made along each scanline 23, depending on the determined displacement distance D0, D1, D2, D3 of each characteristic region 29 of the profile 25 of the respective scanline 23, between the object 15 and the background 15'.

A segmentation criterion 31 which provides, for example, a comparison between the respective displacement distance D0, D1, D2, D3 with an expected displacement distance De that results from the known height He of the object 15, can be taken as a basis for this. The comparison can here provide a tolerance interval within which an identity of the respective displacement distance D0, D1, D2, D3 to the expected displacement distance De can be recognized or signaled.

FIG. 3 illustrates how a segmentation 32 can be performed in two segments 33, 34 along a scanline 23. The segment 33 can describe a section of a scanline 23 that is assigned to the object 15. The segment 34 can describe a section of a scanline 23 that is assigned to the background 15'.

A description of the dimension and/or shape 19 of the object 15 can now be determined from all the segments 33 of all the scanlines 23.

The dimension and/or shape 19 can be signaled to a further component in the transportation vehicle, for example, to a driver assistance system that brings the transportation vehicle 10 autonomously or automatically toward the object 15.

An accurate advance or approach 17 of the transportation vehicle 10 to an object 15 with a known height He is thus possible even when no knowledge of the shape 19 is present. Knowledge of the shape is not required. The shape 19 of the object 15 is detected. A precise destination position of, for example, the trailer coupling 18 can thus be achieved and/or a collision with the object 15 during the approach 17 avoided.

For this purpose, the control apparatus 12 carries out an analysis of the movement of the individual images 21, 22 in the light of the transportation vehicle movement during the approach 17. Individual image regions of the images 21, 22 are assigned on the one hand to the background 15' (e.g., the driving surface or the ground level) and on the other hand to the object 15 of known height He. The image regions are represented as scanlines 23. In three dimensional space 23', these correspond that proceed at the known height He of the object 15 and whose shape is projected or mapped as scanlines 23 in the respective image 21, 22. These scanlines 23 are analyzed across temporally adjacent images 21, 22 with reference to the image property 24, for example, by an edge detection function. A check is made as to which parts or segments 33, 34 of each scanline 23 correspond to the expected object movement in accordance with the expected displacement distance De (yielding an assignment to the object 15), and which conflict with that assumption (corresponding to an assignment to the background 15'). With a sufficient number of scanlines 23 (for example, more than 5, in particular, more than 10), this permits a segmentation 32 which can be used for a determination of the external shape of the object 15. A precise and obstacle-free advance or approach 17 to the object 15 is thereby possible.

A conclusion can furthermore be drawn through triangulation of the nearest point of the object to the transportation vehicle 10 as to the height of this nearest point. This can be used as a further safety feature. The transportation vehicle 10 can thus be brought up to the described destination position precisely. If necessary, an offset depending on the destination position can be used to take up a position relative thereto.

The approach presented offers a recognition of the external shape of the object 15 and a recognition of an object geometry through analysis of an image property, for example, an edge function, whereby a collision of the transportation vehicle 10 with the object 15 can be prevented, and an advance to a destination position can be carried out.

The object 15 can here be a trailer towbar of a trailer 16 to which the trailer coupling socket of the transportation vehicle 10 is to be coupled or docked. The trailer coupling 18 (trailer coupling apparatus) can here be positioned under the trailer coupling socket, which defines the destination position. The real destination position in this case can, however, provide an offset or displacement, namely half of the diameter of the coupling dome of the trailer coupling socket to the nearest described point of the object 15 from the transportation vehicle 10.

Altogether, the example shows how an optical segmentation can be provided through the disclosed embodiments.

LIST OF REFERENCE SIGNS

10 Transportation vehicle
11 Camera
12 Control apparatus
13 Capture region
14 External region
15 Object
15' Background
16 Trailer
17 Approach
18 Trailer coupling
19 Dimension and/or shape
20 Method
21 Image
22 Image
23 Scanline
23' Beam
24 Image property
25 Profile
26 Axis
27 Corresponding profile
28 Feature detection
29 Characteristic region
30 Recognized characteristic region
31 Segmentation criterion
32 Segmentation
33 Segment
34 Segment
He Known height
D0, D1 Displacement distance
D2, D3 Displacement distance
De Expected displacement distance
T0, T1 Measurement time point

The invention claimed is:

1. A transportation vehicle control apparatus comprising a computing device to carry out method operations for recognizing the shape of an object in an external region of the transportation vehicle, the method operations including:
generating, at at least two different measurement time points, a respective image that shows the object in front of a background of the external region by a camera by the control apparatus of the transportation vehicle while the transportation vehicle moves relative to the object;
specifying at least one scanline in a first one of the images and for each scanline, and specifying a corresponding scanline in each other of the images;

determining, for each scanline of the first image, a profile resulting along the scanline for a predetermined image property;

determining a resulting corresponding profile along the respective corresponding scanline of each other image;

determining at least one characteristic region of the profile of each scanline of the first image;

comparing the profile of each scanline of the first image to the respective corresponding profile of each other image to recognize the at least one characteristic region in the respective corresponding profile;

determining a displacement distance resulting between the measurement time points of the characteristic region along the respective scanline for each characteristic region to recognize the distance that the characteristic region has been displaced along the respective scanline as a result of the relative movement of the transportation vehicle to the object in the other image; wherein this displacement depends on the distance of the respective image content, which in each case is either object or background, from the camera; and distinguishing the object from the background along each scanline based on the determined displacement distance of each characteristic region of the profile of the scanline.

2. The transportation vehicle control apparatus of claim 1, wherein the predetermined image property comprises a color value and/or a contrast value and/or an edge detection value of an image content of the image.

3. The transportation vehicle control apparatus of claim 1, wherein the characteristic regions are specified by a predetermined feature detection which identifies at least one predetermined characteristic pattern in the respective profile as a characteristic region.

4. The transportation vehicle control apparatus of claim 3, wherein a height value is assigned to each characteristic region of the profile of each scanline depending on its displacement distance to distinguish between object and background, and a height profile is generated along each scanline, and a distinction is made based on the respective height profile between object and background along each scanline.

5. The transportation vehicle control apparatus of claim 3, wherein the height values of the characteristic regions are rastered to a predetermined number of possible height values.

6. The transportation vehicle control apparatus of claim 1, wherein the scanlines and the corresponding scanlines have a progression that corresponds to an image of a beam that extends virtually in a straight line three-dimensionally in the external region away from the transportation vehicle at a predetermined height.

7. The transportation vehicle control apparatus of claim 1, wherein a movement of the transportation vehicle directly forwards is recognized, and the images are generated during the direct forwards movement.

8. The transportation vehicle control apparatus of claim 1, wherein a shape of the scanlines is adjusted depending on a steering angle of the transportation vehicle.

9. The transportation vehicle control apparatus of claim 1, wherein a driving surface of the transportation vehicle is captured as the background.

10. The transportation vehicle control apparatus of claim 1, wherein the images are determined during an approach of the transportation vehicle to a trailer towbar of a trailer, and a dimension and/or shape of the trailer towbar is determined based on the distinction between object and background.

11. The transportation vehicle control apparatus of claim 1, wherein all segments in the height profiles whose height value lies in a predetermined value interval are assigned to the object.

12. The transportation vehicle control apparatus of claim 11, wherein two possible height values are provided, wherein one represents an expected height of the object and a second represents an expected height of the background, and binary height profiles are generated.

13. The transportation vehicle control apparatus of claim 11, wherein the height profiles of the scanlines are combined to form a two-dimensional height map.

14. A transportation vehicle comprising:

at least one camera for capturing an external region of the transportation vehicle; and a transportation vehicle control apparatus coupled to the at least one camera and comprising a computing device to carry out method operations for recognizing the shape of an object in an external region of the transportation vehicle, the method operations including:

generating, at at least two different measurement time points, a respective image that shows the object in front of a background of the external region by a camera by the control apparatus of the transportation vehicle while the transportation vehicle moves relative to the object;

specifying at least one scanline in a first one of the images and for each scanline, and specifying a corresponding scanline in each other of the images;

determining, for each scanline of the first image, a profile resulting along the scanline for a predetermined image property;

determining a resulting corresponding profile along the respective corresponding scanline of each other image;

determining at least one characteristic region of the profile of each scanline of the first image;

comparing the profile of each scanline of the first image to the respective corresponding profile of each other image to recognize the at least one characteristic region in the respective corresponding profile;

determining a displacement distance resulting between the measurement time points of the characteristic region along the respective scanline for each characteristic region to recognize the distance that the characteristic region has been displaced along the respective scanline as a result of the relative movement of the transportation vehicle to the object in the other image; wherein this displacement depends on the distance of the respective image content, which in each case is either object or background, from the camera; and distinguishing the object from the background along each scanline based on the determined displacement distance of each characteristic region of the profile of the scanline.

15. The transportation vehicle of claim 14, wherein the predetermined image property comprises a color value and/or a contrast value and/or an edge detection value of an image content of the image.

16. The transportation vehicle of claim 14, wherein the characteristic regions are specified by a predetermined feature detection which identifies at least one predetermined characteristic pattern in the respective profile as a characteristic region.

17. The transportation vehicle of claim 16, wherein a height value is assigned to each characteristic region of the profile of each scanline depending on its displacement distance to distinguish between object and background, and a height profile is generated along each scanline, and a distinction is made based on the respective height profile between object and background along each scanline.

18. The transportation vehicle of claim 16, wherein the height values of the characteristic regions are rastered to a predetermined number of possible height values.

19. The transportation vehicle of claim 14, wherein the scanlines and the corresponding scanlines have a progression that corresponds to an image of a beam that extends virtually in a straight line three-dimensionally in the external region away from the transportation vehicle at a predetermined height.

20. The transportation vehicle of claim 14, wherein a movement of the transportation vehicle directly forwards is recognized, and the images are generated during the direct forwards movement.

21. The transportation vehicle of claim 14, wherein a shape of the scanlines is adjusted depending on a steering angle of the transportation vehicle.

22. The transportation vehicle of claim 14, wherein a driving surface of the transportation vehicle is captured as the background.

23. The transportation vehicle of claim 14, wherein the images are determined during an approach of the transportation vehicle to a trailer towbar of a trailer, and a dimension and/or shape of the trailer towbar is determined based on the distinction between object and background.

24. The transportation vehicle of claim 14, wherein all segments in the height profiles whose height value lies in a predetermined value interval are assigned to the object.

25. The transportation vehicle of claim 24, wherein two possible height values are provided, wherein one represents an expected height of the object and a second represents an expected height of the background, and binary height profiles are generated.

26. The transportation vehicle of claim 24, wherein the height profiles of the scanlines are combined to form a two-dimensional height map.

27. A method for recognizing the shape of an object in an external region of a transportation vehicle, the method comprising:
   generating, at at least two different measurement time points, a respective image that shows the object in front of a background of the external region by a camera by the control apparatus of the transportation vehicle while the transportation vehicle moves relative to the object;
   specifying at least one scanline in a first one of the images and for each scanline, and specifying a corresponding scanline in each other of the images;
   determining, for each scanline of the first image, a profile resulting along the scanline for a predetermined image property;
   determining a resulting corresponding profile along the respective corresponding scanline of each other image;
   determining at least one characteristic region of the profile of each scanline of the first image;
   comparing the profile of each scanline of the first image to the respective corresponding profile of each other image to recognize the at least one characteristic region in the respective corresponding profile;
   determining a displacement distance resulting between the measurement time points of the characteristic region along the respective scanline for each characteristic region to recognize the distance that the characteristic region has been displaced along the respective scanline as a result of the relative movement of the transportation vehicle to the object in the other image; wherein this displacement depends on the distance of the respective image content, which in each case is either object or background, from the camera; and
   distinguishing the object from the background along each scanline based on the determined displacement distance of each characteristic region of the profile of the scanline.

28. The method of claim 27, wherein the predetermined image property comprises a color value and/or a contrast value and/or an edge detection value of an image content of the image.

29. The method of claim 27, wherein the characteristic regions are specified by a predetermined feature detection which identifies at least one predetermined characteristic pattern in the respective profile as a characteristic region.

30. The method of claim 29, wherein a height value is assigned to each characteristic region of the profile of each scanline depending on its displacement distance to distinguish between object and background, and a height profile is generated along each scanline, and a distinction is made based on the respective height profile between object and background along each scanline.

31. The method of claim 29, wherein the height values of the characteristic regions are rastered to a predetermined number of possible height values.

32. The method of claim 27, wherein the scanlines and the corresponding scanlines have a progression that corresponds to an image of a beam that extends virtually in a straight line three-dimensionally in the external region away from the transportation vehicle at a predetermined height.

33. The method of claim 27, wherein a movement of the transportation vehicle directly forwards is recognized, and the images are generated during the direct forwards movement.

34. The method of claim 27, wherein a shape of the scanlines is adjusted depending on a steering angle of the transportation vehicle.

35. The method of claim 27, wherein a driving surface of the transportation vehicle is captured as the background.

36. The method of claim 27, wherein the images are determined during an approach of the transportation vehicle to a trailer towbar of a trailer, and a dimension and/or shape of the trailer towbar is determined based on the distinction between object and background.

37. The method of claim 27, wherein all segments in the height profiles whose height value lies in a predetermined value interval are assigned to the object.

38. The method of claim 37, wherein two possible height values are provided, wherein one represents an expected height of the object and a second represents an expected height of the background, and binary height profiles are generated.

39. The method of claim 37, wherein the height profiles of the scanlines are combined to form a two-dimensional height map.

* * * * *